United States Patent [19]

Sinclair

[11] Patent Number: 5,153,250

[45] Date of Patent: Oct. 6, 1992

[54] FIBER-FILLED POLYPHTHALAMIDE COMPOSITION

[75] Inventor: David P. Sinclair, Winfield, Ill.

[73] Assignee: Amoco Corporation, Chicago, Ill.

[21] Appl. No.: 718,202

[22] Filed: Jun. 20, 1991

Related U.S. Application Data

[63] Continuation of Ser. No. 342,099, Apr. 21, 1989, abandoned.

[51] Int. Cl.⁵ ............................................. C08K 5/20
[52] U.S. Cl. ................................. 524/230; 524/451; 524/399; 524/398; 524/401
[58] Field of Search ............... 524/451, 230, 399, 398, 524/401

[56] References Cited

U.S. PATENT DOCUMENTS

| | | | |
|---|---|---|---|
| 3,755,221 | 8/1973 | Hitch | 260/18 N |
| 3,830,777 | 8/1974 | Burton | 260/37 N |
| 4,501,844 | 2/1985 | Chen et al. | 524/451 |
| 4,617,342 | 10/1986 | Poppe et al. | 524/606 |
| 4,863,991 | 9/1989 | Poppe et al. | 524/606 |

*Primary Examiner*—Melvyn I. Marquis
*Assistant Examiner*—Karen A. Hellender
*Attorney, Agent, or Firm*—Stephen L. Hensley; William H. Magidson; Robert J. Wagner

[57] ABSTRACT

Improved polyphthalamide compositions, particularly for injection molding applications, comprise a polyphthalamide component with at least two recurring units selected from terephthalamide, isophthalamide and adipamide units and having high heat deflection temperature when filled with glass fibers; reinforcing fibers; and effective amounts of particulate talc. Molded articles prepared from such compositions exhibit excellent mechanical and thermal properties, including high heat deflection temperature, even when molded using molds heated below Tg of the polyphthalamide component, often facilitating molding using steam or hot water-heated molds.

16 Claims, No Drawings

FIBER-FILLED POLYPHTHALAMIDE COMPOSITION

This is a continuation of application Ser. No. 342,099, filed Apr. 21, 1989 now abandoned as of Sep. 19, 1991.

FIELD OF THE INVENTION

This invention relates to reinforced polyphthalamide compositions and, more particularly, fiber-filled polyphthalamide compositions having improved molding performance.

BACKGROUND OF THE INVENTION

Commonly assigned U.S. Pat. No. 4,603,166 to Poppe et al., issued Jul. 29, 1986, discloses polyphthalamide compositions which, when filled with glass fibers and molded, have heat deflection temperatures at 264 psi, determined according to ASTM D-648, above about 245° C. (473° F.). Included are compositions comprising recurring terephthalamide and adipamide or terephthalamide, isophthalamide and adipamide units and, preferably, wherein the mole ratio of dicarboxylic acid moieties provided by the terephthalamide, isophthalamide and adipamide units is about 65–90:25–0:35–5, respectively. As disclosed therein, such compositions, including particulate- and fiber-filled compositions, exhibit desirable thermal properties including deflection temperature, high tensile strength and flexural modulus and are useful in various applications including preparation of molded articles, fibers, and laminates.

Commonly assigned U.S. Pat. No. 4,617,342 to Poppe et al., issued Oct. 14, 1986, and commonly assigned, copending application Ser. No. 142,469 filed Jan. 8, 1988, and published European Patent Application No. 84300745.1 (Publication No. 0122688), published Oct. 24, 1984, disclose polyphthalamides which, when filled with glass fibers, have heat deflection temperatures at 264 psi, determined according to ASTM D-648, above 240° C. Compositions according to U.S. Pat. No. 4,617,342 are prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Compositions taught in application Ser. No. 142,469 are based on terephthalic acid and isophthalic acid compounds in a mole ratio of about 70:30 to about 99:1 and hexamethylene diamine. Such compositions have utility in various applications, the neat and fiber-filled compositions being particularly suited for molding applications.

While such poyphthalamides filled with reinforcing fibers can be injection molded into articles having desirable mechanical and thermal properties, injection molding conditions for many of the polyphthalamides, and particularly those having a relatively high content of terephthalamide units (e.g., greater than about 50 mole %) are often more severe than in the case of lower melting point polyamides such as poly(hexamethylene adipamide). Attainment of optimum properties in such polyphthalamide molded articles also can be complicated by molding conditions required to develop sufficient crystallinity in the molded polyphthalamides to achieve significant increases in heat deflection temperature and other properties dependent on crystallinity. In particular, the polyphthalamides have glass transition temperatures ("Tg") generally ranging up to about 130° C.; however conventional steam- or hot water-heated molds, which typically can reach temperatures up to about 100° C. ±10° C., may be inadequate to allow for consistent development of sufficient crystallinity in many of the polyphthalamides to obtain significant property appreciation or may require undesirably long molding cycle times to do so. Of course, higher mold temperatures can be achieved with oil heated molds and molding cycle times can be increased or annealing of molded articles can be conducted to increase crystallization and thereby enhance properties dependent thereon; however, these alternatives add cost and complexity to a molding operation. Accordingly, it will be appreciated that it would be desirable to modify such polyphthalamides to facilitate consistent attainment of heat deflection temperatures and other desirable properties in molding without sacrificing other desirable properties.

In general, it is known that modification of polymer properties may be accomplished in various ways. Modification of molecular structure through use of additional or different monomers in polymerization can lead to desirable improvements in some properties. However, the same often are accompanied by loss of other desirable properties and use of additional or different monomers is not always practical due to process considerations. In certain of the above-described polyphthalamides, replacement of terephthalamide units with adipamide units is effective to lower Tg of the compositions, thereby facilitating molding at lower mold temperatures; however, other properties, such as resistance to water absorption and thermal degradation may be sacrificed. Use of additives may lead to property improvements without complicating a polymerization process; however the effects of additives often are unpredictable and, again, improvements in some properties often are achieved at the expense of other properties. For example, addition of plasticizers to the above-described polyphthalamides can result in lowering of Tg but this is achieved at the expense of mechanical properties such as modulus. Blending a given polymer with one or more other polymers may give compositions with a combination of properties intermediate those of the individual components; however, processing requirements often limit the number of candidates that can be blended with a given polymer in an attempt to attain desirable property modifications. Also, blending often is unpredictable; properties of a blend may reflect a desirable balance of the properties of its components or they may be better or worse than those of the components depending on compatibility of the components, reactivity thereof under blending or processing conditions and other factors.

It is an object of this invention to provide fiber-filled polyphthalamide compositions of improved melt processibility. A further object of the invention is to provide such filled compositions capable of being injection molded into articles having desirable mechanical and thermal properties. Another object of the invention is to provide such filled compositions capable of being molded into articles having such properties even when molded using molds heated at below Tg of the polyphthalamide so as to permit use of steam- or hot water-heated molds with a number of such polyphthalamides. Another object of the invention is to provide an improved process for molding such filled polyphthalamide compositions into useful fabricated products. A particular object of the invention is to provide fiber-filled polyphthalamide molding compositions which, when molded using a mold heated to within about 20° C. of Tg of the polyphthalamide, have heat deflection temperatures at 264 psi, according to ASTM D-648, substantially equal to or greater than those achieved when molded using a mold heated at Tg of the polyphthalamide. Other objects of the invention will be apparent to persons skilled in the art from the following description and claims.

I have now found that the objects of this invention can be achieved by providing certain fiber-filled polyphthalamide compositions having at least minor amounts of particulate talc incorporated therein. Such compositions exhibit increases in heat deflection temperature at least comparable to those achieved with the fiber-filled polyphthalamides without particulate talc but at lower mold temperatures. Such improvements are attained using molds heated below Tg of the polyphthalamide component, thereby facilitating use of steam- or hot water-heated molds in molding of some of the polyphthalamides.

THE PRIOR ART

The aforementioned U.S. Pat. Nos. 4,603,166 and 4,617,342 disclose that the polyphthalamides taught therein can contain fillers including minerals and fibers, preferably at levels of about 10-60 wt. %, for extending or providing reinforcement to the polyphthalamides. Disclosed particulate fillers include glass beads, Wollastokup and Fortafil 3. As can be seen from Example X of U.S. Pat. No. 4,603,166, heat deflection temperature of a polyphthalamide composition containing 40 or 60 wt. % of certain of these fillers was at most about 200° C. U.S. Pat. No. 4,603,166 also discloses that the polyphthalamides can contain additives including heat stabilizers, UV stabilizers, toughening agents, flame retardants, plasticizers, antioxidants, and pigments. Example VII of the patent also discloses a nucleated, glass fiber-filled polyphthalamide composition containing 1.5 weight percent sodium phenyl phosphinate as a nucleating agent.

U.S. Pat. No. 3,755,221 to Hitch, issued Aug. 28, 1973, discloses fast-cycling, rapidly moldable poly(hexamethylene adipamide) compositions containing 0.001-0.5 wt. % inert, particulate nucleating agent having average diameter less than 0.5 micron, 0.01-4 wt. % alkylene diamide derived from a $C_{1-16}$ alkylene diamine and a saturated or unsaturated $C_{12-20}$ monocarboxylic acid and 0.01-2 wt. % of a metal salt of a saturated or unsaturated $C_{12-20}$ monocarboxylic acid. According to Hitch, the nucleating agent induces formation and growth of a crystalline texture characterized by reduction in spherulite size and in the degree of supercooling of the molten poly(hexamethylene adipamide) on cooling. It also is said to result in solidification of articles molded from the compositions at higher temperatures than otherwise would be the case, thereby reducing mold closed time and increasing production rates. Suitable nucleating agents are said to be any nucleating agent conventionally used in production of polyamides having a fine crystalline structure; disclosed examples include organic polymers of higher melting point than the polyamide or, preferably, an inorganic material such as talc, molybdenum sulfide, graphite or an alkali- or alkaline earth-metal fluoride, particularly calcium fluoride. The alkylene diamide included in the composites according to Hitch is said to function as a mold release agent; N,N'-ethylene-bis-stearamide is disclosed as a preferred alkylene diamide. The metal carboxylate component of Hitch's compositions is said to function as a lubricant that facilitates flow of the molten poly(hexamethylene adipamide). Zinc stearate is disclosed as a preferred material. Inclusion of up to 60 wt. % reinforcing agents such as glass fibers, by weight of polymer, also is disclosed. While Hitch discloses use of particulates to reduce cycle times in molding poly(hexamethylene adipamide) and glass fiber-filled compositions thereof, the patent does not disclose the polyphthalamide component of the compositions of this invention nor does it address difficulties in molding of polyphthalamides requiring more severe molding conditions than poly(hexamethylene adipamide). Further, Hitch's preferred nucleant, calcium fluoride, has been found inferior to particulate talc for lowering mold temperature requirements in fiber-filled compositions containing a polyphthalamide component of the type included in the invented compositions.

Other patents and publications that may be of interest in connection with this invention in disclosing various polyamide compositions containing particulate materials are discussed below; none discloses the composition of this invention or suggests the improvements achieved according thereto.

U.S. Pat. No. 3,843,591 to Hedrick et al., issued Oct. 22, 1974, discloses reinforced polyamide compositions containing a polyamide with intrinsic viscosity of at least about 1.0 and $M_w/M_n$ ratio not greater than about 2.5, and about 2-55 vol. % particulate, crystalline inorganic filler having a Moh's hardness of at least 4 and particle size of about 40 microns or less with at least 95 wt. % of the particles being 15 microns or less, the particulate filler having been treated with certain organosilane coupling agents. The compositions are said to exhibit superior impact strength relative to polyamides with equivalent modulii of elasticity and to be suitable for molding and in heavy duty applications such as some automobile parts formerly requiring zinc die-castings. Polyamides disclosed in the patent are poly(hexamethylene adipamide) and those formed from diamines, such as propanediamine, hexamethylenediamine and octamethylenediamine, and dicarboxylic acids, such as adipic, pimelic, suberic, sebacic and dodecanedioic acids. Disclosed fillers include various minerals, metals, metal oxides and other inorganic compounds including boron carbide, calcium carbonate, silicon carbide and carbon black. Use of such fillers to nucleate polyamides also is disclosed, filler levels in such compositions being about 2-10 vol. %. Addition of small amounts of fibrous materials, such as glass, to the particulate-filled polyamides to provide additional mechanical property improvement also is disclosed.

U.S. Pat. No. 4,131,591 to MacFarlane, Jr., issued Dec. 26, 1978, discloses low creep polyamide molding compositions containing about 5-40 wt. % talc in the form of platy particles of specified surface areas, about 2-40 wt. % wollastonite and about 5-25 wt. % glass fibers.

U.S. Pat. No. 4,292,416 to Shue et al., issued Sep. 29, 1981, while directed to blending of polyarylene sulfides with semicrystalline polyamides or copolyamides to obtain blends of improved molding performance, discloses that polyamides that do not normally contain sufficient crystallinity to attain desirable properties can frequently be improved in those properties through use of nucleating agents. Shue et al. discloses that suitable nucleating agents known in the prior art include finely divided organic or inorganic salts, silica, alumina and boron nitride and that it also is known that other polymers melting above the polyamide melting point can act as nucleating agents for the polyamide.

U.S. Pat. No. 4,501,844 to Chen et al., issued Feb. 26, 1985, and U.S. Pat. No. 4,536,533, also to Chen et al., issued Aug. 20, 1985, are directed to injection moldable, rapidly crystallizable compositions comprising a linear polyamide selected from poly(4,4'-methylenediphenylene azelamide), -sebacimide), -undecanediamide) and -dodecanediamide) and at least one material, selected from talc, sodium benzenesulfonate, polyethylene ionomers, methacrylated butadiene-styrene polymers and certain multi-phase composite interpolymers, in an amount sufficient to promote crystallization of the polyamide. The patent notes that the art of increasing crystallization rate of certain polymers using specific nucleants is known but the art of crystallization is empirical and findings with one polymer cannot as a rule be applied to a different polymer. The polyamides used according to Chen et al. are normally amorphous in solid form unless annealed or heat treated. The crystallinity-promoting additive is used in amounts that can be determined by trial and error, according to Chen et al., generally ranging from about 0.1-20 wt. % based on weight of the polyamide and the crystallinity promoting additive. In the case of talc and benzenesulfonate as crystallinity-promoting additives, Chen et al. discloses that crystallinity is initiated at talc levels of about 0.1-5 wt. % and that both materials promote a surprisingly fast rate of crystallization in the polyamides. Compositions containing up to about 55 wt. % of a reinforcing agent or filler also are disclosed by Chen et al., inorganic and organic fibers, including glass and carbon fibers, being mentioned. Use of talc as a filler also is disclosed. Heat deflection temperatures at 264 psi of compositions according to Chen et al. are said to be extremely high, being in excess of 200° C. and in some cases approximately 250° C. Example 3 of the patents illustrates a composition with about 1 wt. % talc and 33 wt. % glass fibers having heat deflection temperature at 264 psi of 247° C. when molded using a 138° C. mold; however, heat deflection temperature at 264 psi of the composition molded using a 99° C. mold was only 131° C.

Kotza and Milewski, *Handbook of Filler & Reinforcements For Plastics*, Van Nostrand Reinhold Co. (1978), pp 160-170, discusses talc generally, including composition, properties, production and uses thereof. Use of talc as a reinforcement and extender for plastics, primarily polypropylene, is discussed at pages 166-170, it also being noted that talc has been used in various grades of nylon to achieve higher strength and stiffness.

DESCRIPTION OF THE INVENTION

Briefly, the invented compositions comprise (1) a polyphthalamide component comprising at least two recurring units selected from the group consisting of terephthalamide units, isophthalamide units and adipamide units and which, when filled with glass fibers, has a heat deflection temperature at 264 psi, according to ASTM D-648, of at least about 240° C.; (2) about 10 to about 200 parts by weight reinforcing fibers per hundred parts by weight of the polyphthalamide component and (3) at least about 0.01 to about 5 parts by weight particulate talc per hundred parts by weight of the polyphthalamide component.

In greater detail, the polyphthalamide component of the invented compositions suitably comprises at least two recurring units selected from the group consisting of

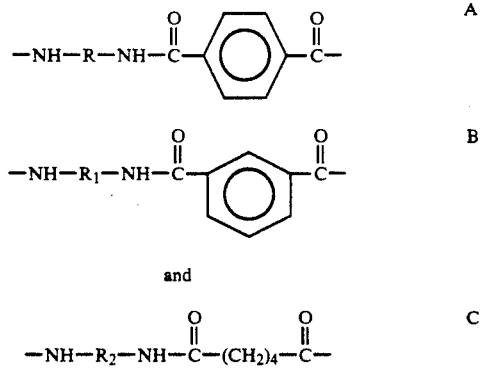

and wherein R, $R_1$ and $R_2$ independently comprise a divalent straight chain or cyclic aliphatic radical which is unsubstituted or substituted with up to one methyl group per carbon atom, such polyphthalamide having the aforesaid heat deflection temperature when filled with 33 wt. % glass fibers.

Such polyphthalamides can be characterized as having a fast or intermediate rate of crystallization. For purposes hereof, such polyphthalamides are characterized as fast crystallizing if heat deflection temperature at 264 psi, according to ASTM D-648, of the polyphthalamide composition filled with 33 wt. % glass fibers and molded using a mold heated above Tg but below the melt crystallization temperature ("Tcm") of the polyphthalamide normally is at least about 240° C. and heat deflection temperature at 66 psi, according to ASTM D-648, of the unfilled polyphthalamide molded using a so-heated mold normally is at least about 220° C. Intermediate crystallizing polyphthalamides, for purposes hereof, are characterized by heat deflection temperatures at 264 psi, according to ASTM D-648, normally of at least about 240° C. when so-filled and molded and heat deflection temperatures at 66 psi, according to ASTM D-648, normally below about 220° C. in the case of the so-molded, unfilled compositions. Polyphthalamides with heat deflection temperatures at 264 psi, according to ASTM D-648, normally below about 240° C. when so-filled and injection molded are slow-crystallizing or amorphous polyamides and are not suitable according to this invention because they lack sufficient crystallinity or crystallizability to develop high heat deflection temperatures when filled with reinforcing fibers and molded. Further, the slow crystallizing polyphthalamides can undergo crystallization during use at elevated temperatures of articles fabricated therefrom, resulting in dimensional change and premature failure.

While the polyphthalamide component of the invented compositions is described herein in terms of heat deflection temperature of at least about 240° C. when filled with 33 wt. % glass fibers, it will be understood that such heat deflection temperatures often are also achieved at different fiber levels, the 33 wt. % level being chosen as a convenient reference point. Glass fibers of the type commonly utilized to prepare glass fiber-filled polyamide compositions suitable for injection molding can be used in the determination of heat deflection temperature. Compounding of such glass fibers with the polyphthalamide is conducted so that substantially uniform dispersion of fibers in the polyphthalamide is achieved. It also will be understood that heat deflection temperatures of the 33 wt. % glass fiber-filled polyphthalamide component of the invented compositions can vary with molding conditions, including mold temperature and, to a lesser extent, cycle time, barrel temperature and injection pressure. Accordingly, while the polyphthalamide component of the invented compositions is defined in terms of a heat deflection temperature at 264 psi, according to ASTM D-648, in respect of the 33 wt. % glass fiber-filled resin, it will be understood that resins having the specified heat deflection temperatures under appropriate conditions are suitable according to this invention even though molding conditions may be varied to avoid attaining such heat deflection temperatures. As indicated above, heat deflection temperatures of at least about 240° C. normally are attained using a mold heated to above Tg but below Tcm of the polyphthalamide for 33 wt. % glass fiber-filled compositions containing the polyphthalamides suitable according to this invention. Suitable polyphthalamides according to the invention also include those that have heat deflection temperatures at 264 psi according to ASTM D-648 below about 240° C. in as-molded form but above about 240° C. after annealing of the molded specimen. Suitable glass fibers, compounding and molding conditions for determining heat deflection temperature at 264 psi, according to ASTM D-648, are illustrated in the examples appearing hereinbelow.

In the formulas A, B and C depicted hereinabove, R, $R_1$ and $R_2$ can be the same or different and comprise a straight chain or cyclic aliphatic divalent radical which is unsubstituted or substituted with up to one methyl substituent per carbon atom. If desired, R, $R_1$ and $R_2$ can comprise a combination of two or more such radicals or a combination of one or more such radicals with one or more other divalent hydrocarbyl radicals, such as a substituted or unsubstituted aromatic or branched aliphatic radical, including straight chain or cyclic aliphatic radicals with two substituents per carbon atom or having substituent groups larger than methyl groups. Crystallinity of the polyphthalamides and heat deflection temperatures of glass fiber-filled compositions thereof tend to decrease with greater numbers of substituents per carbon atom and with larger substituent groups; accordingly, when a combination of such radicals with one or more straight chain or cyclic aliphatic divalent radicals with up to one methyl substituent per carbon atom is present, content of the former should not be so high that the polyphthalamide, when filled with 33 wt. % glass fibers, has a heat deflection temperature at 264 psi, according to ASTM D-648, below about 240° C. Suitable amounts of such other radicals vary depending on the precise structure thereof and can be determined by routine experimentation. As an example, in polyphthalamides containing terephthalamide and isophthalamide units prepared from terephthalic and isophthalic acid compounds in a mole ratio of at least about 4:1, if R, $R_1$ and $R_2$ are a combination of hexamethylene and 2,2,4- or 2,4,4-trimethyl hexamethylene, suitable heat deflection temperatures are attained when the mole ratio of hexamethylene to trimethyl hexamethylene is at least about 1.5:1.

Preferably, R, $R_1$ and $R_2$ comprise at least one divalent straight chain or cyclic aliphatic radical of about 4 to about 20 carbon atoms having up to one methyl substituent per carbon atom because the invented compositions containing a polyphthalamide component containing such radicals exhibit a desirable combination of melt processibility and thermal properties in articles molded therefrom. Examples of such preferred radicals include tetramethylene, 2- and 3-methyl pentamethylene, hexamethylene, 2- and 3-methyl hexamethylene, 2,5-dimethyl hexamethylene, octamethylene, 1,2-, 1,3- and 1,4- cyclohexane, 3,3'-, 3,4'- and 4,4'-dicyclohexylmethane, and dodecamethylene. Most preferably, R, $R_1$ and $R_2$ comprise hexamethylene.

A preferred polyphthalamide component of the invented compositions comprises a semicrystalline polyphthalamide of fast or intermediate crystallization rate based on at least one aliphatic diamine and terephthalic acid, isophthalic acid and adipic acid or terephthalic acid and adipic acid in which the mole ratio of the dicarboxylic acid moieties in units A, B and C, as depicted in the above formulas, is about 65-95:25-0:35-5, with about 65-75:25-15:10 being more preferred. Such polyphthalamides based on various aliphatic diamines and preparation thereof are disclosed in detail in the aforementioned, commonly assigned U.S. Pat. No. 4,603,166 to Poppe et al., issued Jul. 29, 1986, which is incorporated herein by reference. Particularly preferred among such polyphthalamides are those wherein R, $R_1$ and $R_2$ in the above formulas comprise hexamethylene. Most preferably, each of R, $R_1$ and $R_2$ is hexamethylene and the mole ratio of dicarboxylic acid moieties in the A, B and C units is about 65:25:10. Such polyphthalamides have melting points of about 300° to about 350° C., Tgs of about 90° to about 130° C. and inherent viscosities generally ranging from about 0.75 to about 1.4 dl/g, with about 0.9 to about 1.25 dl/g being preferred according to this invention from the standpoint of properties of molded parts and ease of molding. Heat deflection temperatures at 264 psi, according to ASTM D-648, of such polyphthalamides filled with 30-45 wt. % glass fibers and molded at about 120° C. generally range from about 480°-580° F. (250°-305° C.) as disclosed in U.S. Pat. No. 4,603,166.

Also disclosed in U.S. Pat. No. 4,603,166 and suitable as the polyphthalamide component of the invented compositions are polyphthalamides of at least two of terephthalic acid, isophthalic acid and adipic acid compounds, in mole ratios of 65:35:0, 55:35:10, 60:30:10, 50:0:50 and 60:0:40, with hexamethylene diamine. As reported in the patent, the 65:35:0, 55:35:10 and 60:30:10 compositions filled with 30 wt. % glass fibers have heat deflection temperatures at 264 psi of about 115°-132° C. when molded using molds heated at about 120° C. With respect to the 50:0:50 and 60:0:40 compositions, the patent reports heat deflection temperatures at 264 psi of 181° F. (83° C.) and 203° F. (94° C.) when molded without fillers at unspecified mold temperature and heat deflection temperature at 264 psi of 563° F. (295° C.) for the 60:0:40 composition filled with 30 wt. % glass fibers molded at unspecified mold temperature. Tg of such polyphthalamides ranges from about 75° to 90° C. When molded using molds heated at about 96° C., heat deflection temperatures at 264 psi, according to ASTM D-648, of such compositions filled with 33 wt. % glass fibers exceed about 240° C., ranging from about 270° to 295° C.

Polyphthalamides having heat deflection temperatures at 264 psi, according ASTM D-648, when filled with 33 wt. % glass fibers, comprising recurring units A, B and C, as depicted in the formulas above, wherein the mole ratio of the dicarboxylic acid moieties in such units is about 40-65: up to 15:20-60, also are suitable. A specific example of a polyphthalamide having such a composition, disclosed in Table 10 of published European Patent Application No. 84300744.4 (Publication No. 0121984), published Oct. 17, 1984, is a polyphthalamide of terephthalic acid, isophthalic acid and adipic acid in a mole fraction of 55/15/30 with hexamethylene diamine. Heat deflection temperature of the unfilled composition at 264 psi and unspecified mold temperature is reported therein as 194° F. (90° C.); however, when molded at about 104° C., heat deflection temperature of the unfilled composition typically is about 225° C. at 66 psi and about 165° C. at 264 psi and heat deflection temperature at 264 psi of the 33 wt. % glass fiber-filled composition molded at about 104° C. is about 290° C. Especially preferred among such polyphthalamides are those wherein the mole ratio of the dicarboxylic acid moieties in the A, B and C units is greater than 50 but less than 60: greater than 0 to less than 15: at least 25 but less than 50, and especially wherein R, $R_1$ and $R_2$ comprise hexamethylene. Such polyphthalamides exhibit heat deflection temperatures at 264 psi according to ASTM D-648 well in excess of about 240° C. when filled with 33 wt. % glass fibers and have glass transition temperatures less than 100° C. such that molding of the filled compositions to achieve such heat deflection temperatures normally can be carried out using steam-heated molds as opposed to more costly hot oil-heated systems. Incorporation of talc according to the present invention can reduce mold temperature requirements or molding cycle times. Mechanical properties, including tensile and flexural strength and modulus, of such polyphthalamides filled with fibers, especially about 10 to about 60 wt. % glass fibers, together with their melt processibility and low water absorption tendencies (e.g., in the case of the 33 wt. % glass fiber-filled polyphthalamides, water absorption generally is less than about four wt. % after immersion in boiling water for 120 hours) and good retention of mechanical properties when wet, make such filled polyphthalamide compositions particularly well suited for fabrication of injection molded articles for use in humid environments, for example pump housings.

Also suitable as the polyphthalamide component of the invented compositions are polyphthalamides prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. such polyphthalamides, when filled with 33 wt. % glass fibers, have heat deflection temperatures at 264 psi, according to ASTM D-648, of at least about 240° C. and are described in detail in the aforementioned, commonly assigned U.S. Pat. No. 4,617,342 to Poppe et al., issued Oct. 14, 1986, which is incorporated herein by reference. Such polyphthalamides can offer advantages in terms of their extremely high heat deflection temperatures at 264 psi when filled with glass fibers and low water absorption due to an absence of adipamide units; however, melting points of such polyphthalamides are quite high, making melt processing more difficult.

Also suitable for use in the invented compositions are polyphthalamides based on terephthalic acid and isophthalic acid compounds in a mole ratio of about 70-99:30-1 and hexamethylene diamine. These polyphthalamides, when filled with 33 wt. % glass fibers, have heat deflection temperatures at 264 psi, according to ASTM D-648, of at least about 240° C. and are described in detail in commonly assigned, copending application Ser. No. 142,469, which is incorporated herein by reference.

Generally, polyphthalamide compositions comprising at least two recurring units selected from the group consisting of terephthalamide, isophthalamide and adipamide units which, when filled with 33 wt. % glass fibers, have heat deflection temperatures at 264 psi, according to ASTM D-648, of at least about 240° C. are suitable polyphthalamide components of the invented compositions. As can be seen from the preceding paragraphs, suitable polyphthalamides include compositions having mole ratios of dicarboxylic acid moieties in the units A, B and C in the above formulas within the broad ranges of 40-99:0-35:0-60. Heat deflection temperature is influenced by polyphthalamide composition; accordingly, in polyphthalamides suitable according to this invention, proportions of such of the terephthalamide, isophthalamide and adipamide units as are present and the radicals R, $R_1$ and $R_2$ as represented in formulas A, B and C above, are such that the polyphthalamides, when filled with 33 wt. % glass fibers, have heat deflection temperatures at 264 psi according to ASTM D-648 of at least about 240° C.

While precise relationships between composition and heat deflection temperature are not fully understood, the foregoing discussion of suitable polyphthalamide compositions together with a number of general principles provide guidance in providing polyphthalamides of suitable composition and properties for purposes hereof. Generally, melting temperature, rate of crystallization and level of crystallinity in copolyamides of terephthalic acid and isophthalic acid compounds and hexamethylene diamine increase with increasing terephthalamide to isophthalamide mole ratios, other things being equal. Heat deflection temperature at 264 psi according to ASTM D-648 of such copolyamides, when filled with 33 wt. % glass fibers, also increases with increased terephthalamide to isophthalamide mole ratios. Similarly, increasing heat deflection temperatures of glass-filled compositions at increasing terephthalamide plus adipamide to isophthalamide mole ratios in their terpolyamides with hexamethylene diamine can be seen from the aforementioned, commonly assigned U.S. Pat. No. 4,603,166 to Poppe et al. Yu et al., J. Poly. Sci. 42, 249 (1960) reports that adipic acid and terephthalic acid are isomorphous in certain copolyamides, including those with hexamethylene diamine, such that replacement of terephthalic acid with adipic acid results in little change in melting point, although the authors acknowledge inability to prepare high terephthalic acid content copolyamides due to decomposition during the attempted preparations. Yu et al. also reports that crystallinity of polyamides decreases with increased branching of diamines used in preparation thereof, other things being equal.

Without wishing to be bound by theory, it appears that in the case of poly(hexamethylene phthalamides) consisting of at least two recurring units selected from the group consisting of hexamethylene terephthalamide, hexamethylene isophthalamide and hexamethylene adipamide units, there is a proportion of isophthalamide units, i.e., dicarboxylic acid moieties in units B in the above formulas, at or below which the polyphthalamides exhibit sufficient crystallinity and sufficiently high rates of crystallization during molding using a mold heated to at least Tg but below the melt crystallization temperature of the polyphthalamide that heat deflection temperatures at 264 psi, according to ASTM D-648, of the 33 wt. % glass fiber-filled compositions are normally at least about 240° C. Above a somewhat greater proportion of hexamethylene isophthalamide units, crystallinity and rates of crystallization are so low that the so-determined heat deflection temperatures of the 33 wt. % glass fiber-filled compositions normally are less than about 240° C. Between these levels of isophthalamide units, the so-determined heat deflection temperatures of the 33 wt. % glass fiber-filled compositions normally are at least about 240° C. provided that the remaining units of the composition include hexamethylene terephthalamide units and the mole ratio of hexamethylene terephthalamide units to hexamethylene isophthalamide units is high enough.

More specifically, such poly(hexamethylene phthalamides) consisting of about 19 to about 35 mole % hexamethylene isophthalamide units based on total amide units, i.e., wherein the dicarboxylic acid moieties in units corresponding to the formula B above are about 19 to about 35 mole % of the total dicarboxylic acid moieties, when filled with 33 wt. % glass fibers and molded using a mold heated above Tg but below Tcm, normally have heat deflection temperatures at 264 psi, according to ASTM D-648, of at least about 240° C. when the mole percentage of hexamethylene terephthalamide units (i.e., dicarboxylic acid moieties in units corresponding to formula A above) is at least about four times the mole percent hexamethylene isophthalamide units minus 75%. At hexamethylene isophthalamide unit contents in the upper portion of the aforesaid range of about 19 to about 35 mole %, heat deflection temperatures at 264 psi of at least about 240° C., according to ASTM D-648, in respect of the 33 wt. % glass fiber-filled polyphthalamides normally are attained or can be attained through the use of nucleants, increased mold temperatures or annealing after molding. Below about 19 mole % hexamethylene isophthalamide units, heat deflection temperatures at 264 psi, according to ASTM D-648, of the so-filled and so-molded compositions normally exceed about 240° C. whether the remaining units are all hexamethylene terephthalamide units, all hexamethylene adipamide units or a combination of hexamethylene terephthalamide units and hexamethylene adipamide units in any proportion. Above about 35 mole % hexamethylene isophthalamide units, the poly(hexamethylene phthalamides) normally are amorphous or so slow to crystallize that the requisite heat deflection temperature at 264 psi, according to ASTM D/648, normally is not attained even with the use of nucleating agents, annealing or high temperature molds. Thus, polyphthalamides comprising at least two recurring units selected from the group consisting of terephthalamide, isophthalamide and adipamide units which, when filled with 33 wt. % glass fibers, have heat deflection temperatures, according to ASTM D-648, of at least about 240° C. include poly(hexamethylene phthalamides) consisting of at least two recurring units selected from the group consisting of hexamethylene terephthalamide, hexamethylene isophthalamide and hexamethylene adipamide units wherein the mole percent of the dicarboxylic acid moieties in the hexamethylene isophthalamide units based on total dicarboxylic acid moieties is 0 to about 35 mole %; provided that when the mole percent of dicarboxylic acid moieties in the hexamethylene isophthalamide units is about 19 to about 35 mole %, the mole percentages of dicarboxylic acid moieties in the hexamethylene terephthalamide, hexamethylene adipamide and hexamethylene isophthalamide units based on total dicarboxylic acid moieties (referred to below as $M_T$, $M_A$ and $M_I$, respectively) satisfy the following formulas:

$$M_T \geq 4M_I - 75$$

$$M_T + M_I + M_A = 100.$$

Other suitable polyphthalamide compositions, for example, those based on diamines other than or in addition to hexamethylene diamine or comprising, in addition to at least two recurring units selected from terephthalamide, isophthalamide and adipamide units, other dicarboxylic acid amide units, can be employed if desired, suitability of specific compositions being easily determined based on heat deflection temperatures at 264 psi of the 33 wt. % glass-filled compositions, according to ASTM D-648, molded using a mold heated to above Tg but below Tcm of the polyphthalamide.

The polyphthalamide component of the invented compositions can be prepared from the appropriate starting materials, e.g., dicarboxylic acids or their derivatives and diamines, in suitable proportions by any suitable means. As disclosed in U.S. Pat. No. 4,603,166, one such preparation involves a salt preparation step, preferably conducted batchwise to achieve proper stoichiometry, wherein dicarboxylic acid compounds, diamine and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or in continuous mode. In the condensation section substantial conversion of salts to polymer takes place. The condensation product then typically is introduced into a finishing section, such as a twin-screw extruder, to obtain further conversion and generally increase inherent viscosity from a level of about 0.1 to about 0.6 dl/g achieved in the condensation section up to about 0.8 dl/g or greater. The polymeric product can be recovered from the finishing section and, for example, pelletized or mixed with fillers, additives and the like. Commonly assigned U.S. Pat. No. 4,603,193, issued Jul. 29, 1986, to Richardson et al., also discloses preparation of such polyamides.

Reinforcing fibers contained in the invented compositions are inorganic or organic fibers having sufficiently high modulus to provide reinforcement to the polyphthalamide component and capable of withstanding temperatures employed in melt processing the invented compositions. Preferred fibers have modulus of at least about two million psi in order to achieve substantial increases in mechanical properties relative to those of the polyphthalamide component. Specific examples of suitable reinforcing fibers include glass, graphite, boron, ceramic and aramid fibers, with glass fibers being most preferred. Specific examples of glass fibers include alkali-free, boron-silicate glass or alkali-containing C-glass. Suitably, average thickness of the fibers is, between about 3 and 30 microns. It is contemplated to use long fibers e.g., ranging from about 5 mm to about 50 mm, and also short fibers, e.g., from about 0.05 mm to about 5 mm. In principle, any standard commercial grade fiber, especially glass fibers, can be used.

Preferred glass fibers for injection molding applications have lengths of about 0.25 mm to about 25 mm. While longer or shorter fibers are suitable, the former can be difficult to disperse in the polyphthalamide component, thereby lessening their reinforcing effect. Shorter fibers are easily dispersed but provide less reinforcement due to their low aspect ratio.

The fibers can be sized or unsized and may include a coupling agent to improve adhesion of the fibers to the polyphthalamide component. Commercially available glass fibers supplied with sizing agent applied thereto can be used as such or with the size removed, for example by abrasion. Sizing agents resistant to degradation or release of volatiles at temperatures employed in processing the invented compositions are preferred; examples include polyesters and polyester-urethanes. Examples of coupling agents include various silane, titanate and chromium compounds as known to those skilled in the art.

The invented compositions contain reinforcing fibers in an amount effective to provide mechanical property reinforcement to the polyphthalamide component though not at such a high level as to substantially adversely affect melt processibility of the compositions. Suitably, about 10 to about 200 parts by weight reinforcing fibers per hundred parts by weight of the polyphthalamide component are used as lesser amounts provide insufficient reinforcement while higher amounts can be difficult to disperse uniformly in the polyphthalamide component and increase melt viscosity such that melt processibility may be sacrificed. Preferably, about 15 to about 100 parts by weight fibers per hundred parts by weight polyphthalamide component are used to obtain substantial reinforcement while maintaining processibility.

The invented compositions also contain particulate talc. As is known, the mineral talc is a hydrated magnesium silicate corresponding to the formula $3MgO.4SiO_2.H_2O$ and having a Moh's hardness of 1. Commercial talcs generally comprise the mineral talc and up to about 60 wt. % of other minerals, such as anthophyllite, calcite, chlorite, diopside, dolomite, magnesite, quartz, serpentine and tremolite. Moh's hardness of commercial talcs generally exceeds 1 due to the presence of such other minerals. Any suitable commercial talc can be used according to the present invention.

The invented compositions contain at least about 0.01 to about 5 parts by weight particulate talc per hundred parts by weight of the polyphthalamide component. Lesser amounts are ineffective to provide significant heat deflection temperature-promoting effect. At talc levels above about two parts by weight per hundred parts by weight polyphthalamide, heat deflection temperature-promoting effect does not significantly increase with further addition of talc; accordingly, when used to achieve increased heat deflection temperature at lower mold temperatures, talc levels of about 0.01 to about 2 parts by weight are preferred, best results being achieved at about 0.1 to about 0.5 part by weight per hundred parts by weight polyphthalamide component. Talc may be included as a filler or extender for the fiber-filled polyphthalamide compositions at levels greater than about 5 parts by weight per hundred parts by weight polyphthalamide component; however, these levels may affect other properties.

The talc component is used in particulate form, generally having a maximum particle size of up to about 100 microns. Fine and intermediate grade commercial talcs are suitable. Particle size of the particulate talc, while not critical to achieving heat deflection temperature promotion in the invented compositions, may influence the extent of increases in heat deflection temperature at a given mold temperature. Preferably, average particle size is at least about one micron as the same promotes increases in heat deflection temperature greater than those achieved with smaller sized particles.

The compositions according to this invention can be prepared by combining components comprising the polyphthalamide component, reinforcing fibers and talc by any suitable means. Conveniently, polyphthalamide component in powder or pellet form and the other components are melt compounded in desired amounts, at a temperature effective to render the polyphthalamide component molten without degradation thereof, in a high shear mixer, e.g., a twin-screw extruder, to obtain substantially uniform dispersion of fibers and talc in the polyphthalamide. Use of kneading blocks or other suitable mixing elements in compounding aids in achieving a high degree of dispersion of the components. To minimize degradation of the polyphthalamide component, preferred temperatures when using a twin-screw mixer are equal to or up to about 20° C. greater than the melting point of the component. Blending of the components in solid form prior to melt compounding can be conducted to facilitate melt blending. Fibers and talc also can be incorporated by feeding the same to the molten polyphthalamide in an extruder or other compounding apparatus or by other suitable methods.

The invented compositions also can contain pigments, stabilizers, fillers, extenders, flame retardants, lubricants, impact modifiers and other suitable additives to improve or modify properties. As noted hereinabove, U.S. Pat. No. 3,755,221 to Hitch discloses various alkylene diamides, e.g., $C_{1-16}$ alkylenediamides of lauric, myristic, palmitic, stearic and other saturated or unsaturated monocarboxylic acids, as mold release agents and metal carboxylates, e.g., lithium, sodium, potassium, magnesium salts of $C_{12-20}$ monocarboxylic acids, as lubricants. Other conventional additives include mold lubricants such as stearyl alcohol, metallic stearates and ethylene bis-stearamide and heat stabilizers such as alkali metal halides and combinations thereof with copper salts as taught in U.S. Pat. No. 3,830,777 to Burton, issued Aug. 20, 1974, and phosphorous acid, sodium or alkyl or aryl phosphates and phosphites, various cupric salts of organic or inorganic acids, such as cupric acetate and butyrate, and alkali or alkaline earth metal halides, such as sodium iodide and potassium iodide as taught in U.S. Pat. No. 2,705,227 to Stamatoff issued Mar. 24, 1955. Preferred heat stabilizers for the invented compositions are potassium iodide, sodium iodide and combinations thereof as well as combinations of either or both with cupric acetate; preferred mold release agents include aluminum distearate, hexamethylene bis-stearamide wax and combinations thereof. When used, preferred levels range from about 0.01 to about 2 parts by weight heat stabilizer, with about 0.01 to about 1.5 parts iodide salt and about 0.01 to about 0.5 parts cupric acetate when using combinations of the same, per hundred parts by weight polyphthalamide component. Preferred levels of such mold release agents range from about 0.01 to about 5 parts by weight per hundred parts by weight of the invented compositions.

The invented compositions are particularly useful as injection molding compounds for production of molded objects, for example, electronic connectors, switch components, pump housings, valve components and under-the-hood automobile parts. Injection molding of such compositions generally is conducted using standard injection molding equipment. Injection molding generally is accomplished by heating the invented compositions to above the melting point of the polyphthalamide component thereof but not so high as to substantially degrade the same, injecting the composition into a mold maintained at a temperature of about 20° C. below Tg of the polyphthalamide component to about 20° C. above such Tg and maintaining the composition in the mold for a time effective to solidify the molten polyphthalamide component. A 20 second to 1 minute cycle time, barrel temperatures generally ranging from about 300° to about 400° C. and mold temperatures of about 60° C. to about 200° C. are suitably employed with specific temperatures varying depending on melting point, degradation temperature and Tg of the polyphthalamide component. In a preferred embodiment of the invention, the invented compositions in which the polyphthalamide component has a Tg of about 80° C. to about 125° C. are heated at about 310° to about 360° C. to melt the component and molded using a steam- or hot water-heated mold at about Tg±20° but no greater than about 100° C.±10° C.

The present invention is described further in connection with the following examples and control examples, it being understood that the same are for purposes of illustration and not limitation.

EXAMPLE 1

To a 5-gallon, stirred tank reactor with internal coils, an oil jacket for temperature control, and a pitched-blade turbine with a variable speed drive were charged terephthalic acid, isophthalic acid, adipic acid, hexamethylene diamine and water in amounts such that the mole ratio of the acids was 65:25:10, the mole ratio of the acids to diamine was 100:102 and water content was 15 wt. %. In addition, 500 ppm sodium hypophosphite catalyst and an amount of benzoic acid corresponding to one mole %, based on moles of the aforementioned acids, were charged. After charging the reactor, it was purged with nitrogen and heated to about 216° C. The pressure was set to 480 psig by first allowing the water to reach its equilibrium pressure and then adjusting with nitrogen. Residence time of the reactor's contents averaged about 100 minutes.

Contents of the reactor were passed through a 140 micron filter into a two-headed positive displacement Bran-Lubbe pump. Temperature through the pump was maintained at about 233° C. Pressures were increased to about 1800 psig in the pump. After passing through the pump, the solution was passed through a preheat zone and heated to between about 325° and 332° C. Residence time in the preheater was about 40 seconds.

The resulting solution was transferred to a flash reactor through a valve manufactured by Research Control Valve (RCV) where pressure was reduced from about 1800 psig to about 100 psig. The flash reactor was a tubular reactor about 9 feet long with an internal diameter of 0.375 inch. The wall temperature of this reactor was maintained at about 370° to 400° C. Heat was supplied by a hot oil jacket. Temperature of the reaction mixture was between about 270° C. and 332° C. within the reactor. Pressure within the flash reactor was controlled by a second RCV valve. Residence time in the flash reactor was about 10 seconds.

Upon exiting the flash reactor, the reaction mixture was injected directly onto the screws of a twin-screw extruder/reactor, Werner-Pfleiderer ZSK-30. The screw configuration employed consisted of four basic sections. The first section was composed of relatively long pitches for conveying the polymerization mixture away from the feed port. The second section was a short compression section which compressed the polymerization mixture and provided a melt seal for the reaction zone. The reaction zone comprised about 70–80 percent of the entire length of the extruder. The final section was a compression section. The twin-screw extruder increased the molecular weight of the polymer, to provide an inherent viscosity of the finished polymer of at least about 0.8 dl/g. The process conditions employed in the twin-screw reactor included barrel temperatures of about 290°–305° C. in an initial zone, about 315°–320° C. in intermediate zones and about 305° C. in a final zone. Melt temperature was about 319°–322° C., screw speed was set at 100 rpm and screw torque was about 14–17%. Four batches of polyphthalamides of like composition prepared in such manner were combined and the result had an inherent viscosity of about 0.87 dl/g. Melting point was 312° C. Melt crystallization temperature was 270° C. and Tg was 117° C.

EXAMPLE 2

A sample of the polyphthalamide prepared in EXAMPLE 1 was dried to a maximum moisture content of about 1000 ppm in a vacuum oven at 110° C. for about 14 hours. Thereafter, about 2.14 kg of the polyphthalamide, about 0.26 kg of a cupric acetate-potassium iodide heat stabilizer concentrate, containing 1530 ppm copper and 1.0 wt. % iodide, in a polyphthalamide as in EXAMPLE 1 (the concentrate also having been dried for about 14 hours at about 110° C. in a vacuum oven), about 1.2 kg glass fibers 3 mm long and identified as PPG 3540 obtained from PPG Corp. and about 36 grams of talcum, a commercial talc obtained from Fisher Scientific, having average particle size greater than one micron, were tumbled to thoroughly mix the components and then the tumbled mixture was compounded using a Werner and Pfleiderer ZSK-30 twin-screw extruder operated at a screw speed setting of 50 rpm and barrel temperature settings of 275° C. in a first zone, 320° C. in intermediate zones and 310° C. in the final zones. Screw configuration consisted of initial sections having relatively long pitch followed by spike-like sections, compression sections and final sections of longer pitch. Gas present was allowed to escape from the extruder barrel through a vent port located near the barrel outlet. The composition exited the extruder through a strand die having a circular, 0.24 cm diameter orifice. Screw torque was 19% and die pressure was about 175 psi. The extrudate was cooled and chopped into pellets.

Subsequently, the pellets were injection molded into test bars using an Arburg Injection Molding Machine operated as follows and with varying mold temperatures:

| Rear Zone Setting | 310° C. |
|---|---|
| Front Zone Setting: | 330° C. |
| Nozzle Setting: | 315° C. |
| Injection Pressure: | 35.2 kg/cm$^2$ |
| Holding Pressure: | 21.2 kg/cm$^2$ |
| Back Pressure: | 3.5 kg/cm$^2$ |

-continued

| | |
|---|---|
| Screw Speed: | 160–180 rpm |
| Injection Speed Setting: | 5(fast) |
| Injection Time Setting: | 10 seconds forward, 20 seconds hold |
| Total Cycle Time: | 44 seconds |

For comparison, a control sample was prepared as described above except that no talc was used. The control was molded as described above.

Physical properties of the test bars were determined according to the methods, and are reported herein in the units, identified below.

| | |
|---|---|
| Ultimate Tensile Strength ("UTS") in kg/cm$^2$ | ASTM D-638 (Type 1 test bars tested at 5 cm/minute) |
| Flexural Properties (including Flexural Modulus ("FM") in kg/cm$^2$ × 10$^{-4}$ and Flexural Strength ("FS") in kg/cm$^2$): | ASTM D-790 |
| Notched Izod Impact Strength ("IZOD") in kg-cm/cm notch: | ASTM D-256 |
| Heat Deflection Temperature at 264 psi ("HDT") in °C.: | ASTM D-648 |

Test results are reported in TABLE 1 below wherein the talc-containing samples are designated EX. 2 and the control samples are designated EX. 2A. In accordance with the ASTM test methods identified above, an average of results for the number of samples specified in the test methods is reported in TABLE 1 and subsequent tables.

TABLE I

| EX. | MOLD TEMP (°C.) | UTS | FS | FM | HDT | IZOD |
|---|---|---|---|---|---|---|
| 2 | 82 | 2081 | 2995 | 10.9 | 273 | 9.4 |
| 2 | 93 | 2159 | 3002 | 11.1 | 273 | 9.4 |
| 2 | 104 | 2208 | 3044 | 11.7 | 279 | 9.4 |
| 2 | 136 | 2166 | 2897 | 11.5 | 282 | 8.9 |
| 2A | 104 | 2208 | 3094 | 11.0 | 271 | 11.6 |
| 2A | 121 | 2200 | 3073 | 11.2 | 266 | 11.1 |
| 2A | 136 | 2257 | 2981 | 11.0 | 279 | 11.6 |

EXAMPLE 3

The procedure of EXAMPLE 2 was repeated except the heat stabilizer concentrate was omitted. The polyphthalamide had the same composition as that in Example 2 and was prepared in a similar manner. A control sample of the glass fiber-filled polyphthalamide without talc and stabilizer concentrate also was prepared and tested. The formulations and properties at various mold temperatures are shown in TABLE 2 wherein the talc-containing material is designated EXAMPLE 3 and the control is designated EXAMPLE 3A.

TABLE 2

| | EXAMPLE: | |
|---|---|---|
| | 3 | 3A |
| POLYPHTHALAMIDE (wt. %): | 66 | 67 |
| GLASS FIBERS (wt. %): | 33 | 33 |
| TALC (wt. %): | 1 | 0 |
| HDT (°C.) at Mold Temp (°C.) of: | | |
| 82 | 274 | 249 |
| 93 | 277 | 247 |
| 104 | 277 | 265 |

TABLE 2-continued

| | EXAMPLE: | |
|---|---|---|
| | 3 | 3A |
| 136 | 283 | 274 |

As can be seen, higher heat deflection temperatures were attained at every mold temperature employed with the talc-containing, glass fiber-filled polyphthalamide composition of EXAMPLE 3. Mechanical properties of the EXAMPLE 3 and Control compositions are reported in TABLE 3. As can be seen, tensile strengths and flexural modulii were not significantly affected by the talc. Izod impact strengths were lower for the Example 3 materials but the decreases relative to the talc-free control samples are of little practical consequence because even the higher Izod impact strengths of the control samples are relatively low.

TABLE 3

| | MOLD TEMP: | | | | | | | |
|---|---|---|---|---|---|---|---|---|
| | 82° C. | | 93° C. | | 104° C. | | 136° C. | |
| | EXAMPLE: | | | | | | | |
| | 3 | 3A | 3 | 3A | 3 | 3A | 3 | 3A |
| TS: | 2025 | 1990 | 2060 | 2060 | 2046 | 2067 | 2130 | 2084 |
| FM: | 11.5 | 10.5 | 11.4 | 10.3 | 11.6 | 10.8 | 11.3 | 11.0 |
| IZOD: | 8.9 | 12.2 | 9.4 | 13.3 | 6.7 | 12.2 | 9.4 | 11.6 |

EXAMPLE 4

33 wt. % glass fiber-filled compositions containing various polyphthalamides based on hexamethylene diamine and combinations of terephthalic acid ("TA") and isophthalic acid ("IA") or combinations thereof with adipic acid ("AA") or 1,4-cyclohexane dicarboxylic acid ("CDA") in various mole ratios, 0.3 wt. % talc, 0.9 wt. % potassium iodide-cupric acetate heat stabilizer and 0.25 wt. % Acrawax C (hexamethylene-bis-stearamide wax) supplied by Lonza, Inc., were prepared and tested following generally the procedure of EXAMPLE 2. Polyphthalamide compositions, mold temperature and properties are reported in TABLE 4.

TABLE 4

| POLYPHTHALAMIDE TA/IA/AA/CDA | MOLD TEMP (°C.) | UTS | FS | HDT | IZOD |
|---|---|---|---|---|---|
| 75/10/15/0 | 135 | 2475 | 13.0 | 293 | 10.5 |
| 60/15/25/0 | 135 | 2384 | 12.2 | 277 | 9.4 |
| 60/18/22/0 | 135 | 2362 | 11.4 | 272 | 10.0 |
| 60/20/0/20 | 135 | 2285 | 11.8 | 293 | 10.0 |
| 65/35/0/0 | 135 | 2398 | 10.7 | 274 | 10.0 |

EXAMPLE 5

The effects of talc level on heat deflection temperature were studied using a 33 wt. % glass fiber-filled polyphthalamide prepared, molded and tested following generally the procedure of EXAMPLE 2. The polyphthalamide component was of the same composition as in EXAMPLE 2. Results are shown in TABLE 5.

TABLE 5

| MOLD TEMP (°C.) | HDT (°C.) @ parts by weight talc per hundred parts by weight polyphthalamide | | |
|---|---|---|---|
| | 0.015 | 0.15 | 1.5 |
| 82 | 254 | 269 | 277 |
| 104 | 267 | 281 | 278 |

TABLE 5-continued

| MOLD TEMP (°C.) | HDT (°C.) @ parts by weight talc per hundred parts by weight polyphthalamide | | |
|---|---|---|---|
| | 0.015 | 0.15 | 1.5 |
| 136 | 278 | 286 | 283 |

EXAMPLE 6

Following generally the procedure of EXAMPLE 2, a 33 wt. % glass fiber-filled polyphthalamide, based on terephthalic, isophthalic and adipic acids in a mole ratio of 65/25/10 and hexamethylene diamine, containing 0.25 wt. % talc was prepared, molded and tested. The talc had average and maximum particle sizes of about 10 microns and about 70 microns, respectively. Results of the testing are shown in TABLE 6.

TABLE 6

| | MOLD TEMP (°C.): | | |
|---|---|---|---|
| | 66 | 93 | 136 |
| HDT (°C.): | 274 | 281 | 286 |
| TS: | 2130 | 2088 | 2102 |
| FM: | 11.5 | 11.7 | 11.7 |
| IZOD: | 11.6 | 11.6 | 11.1 |

EXAMPLE 7

Effects of talc particle size were studied by repeating EXAMPLE 6 using talcs of different particle sizes. One of the talcs (designated "A") had a mean particle size of about 1.5 microns with maximum particle size of about 12 microns. The other (designated "B") had a mean particle size of about 1 micron with maximum particle size of about 5 microns. Results are reported in TABLE 7.

TABLE 7

| | MOLD TEMP (°C.): | | | | | |
|---|---|---|---|---|---|---|
| | 66 | | 93 | | 136 | |
| | TALC: | | | | | |
| | A | B | A | B | A | B |
| HDT (°C.): | 251 | — | 264 | 256 | 274 | 275 |
| TS: | 2306 | — | 2405 | 2173 | 2405 | 2215 |
| FM: | 10.5 | — | 10.8 | 11.2 | 10.6 | 10.8 |
| IZOD: | 10.0 | — | 10.0 | 9.4 | 10.0 | 9.4 |

Comparing these results with those in EXAMPLE 6, it can be seen that the larger particle size talc used in EXAMPLE 6 was more effective at the 0.25 weight percent level in raising heat deflection temperature than the smaller particle size talcs used in EXAMPLE 7. Considering that average diameter of crystalline spherulites of the polyphthalamide is typically about 5 microns, and therefore, that spherulite growth around the larger sized talc particles is unlikely, the greater crystallinity-promoting effect of the larger particle size talc in EXAMPLE 6 was surprising.

EXAMPLE 8

A composition as in EXAMPLE 2 and a talc-free control sample were molded into test bars essentially as in that example and amorphous contents of the polyphthalamide at the skin and core of the test bars were determined by differential scanning calorimetry. Amorphous content, by percent, is reported in TABLE 8 as one hundred percent multiplied by the ratio of the enthalpy of cold crystallization measured on the first scan of the skin sample to enthalphy of fusion measured on the second scan after the sample had cooled slowly to allow for full crystallization.

TABLE 8

| | MOLD TEMP (°C.) | | | |
|---|---|---|---|---|
| | 104 | | 136 | |
| | TALC (wt %): | | | |
| | 0 | 1 | 0 | 1 |
| AMORPHOUS (%): | 100 | 38 | 30 | 11 |
| HDT (°C.): | 265 | 277 | 274 | 283 |

EXAMPLE 9

Following generally the procedure of EXAMPLE 2, a 33 wt. % glass fiber-filled polyphthalamide as in that example with and without various particulates was molded into test specimens at varying mold temperatures. Heat deflection temperatures at 264 psi of the compositions are reported in TABLE 9.

TABLE 9

| | HDT (°C.) | | | | | | |
|---|---|---|---|---|---|---|---|
| | PARTICULATE: | | | | | | |
| | NONE | TALC | TiO$_2$ | CaF$_2$ | PTFE | KI | CaO |
| MOLD TEMP (°C.): | AMOUNT (wt %): | | | | | | |
| | 0 | 0.25 | 0.5 | 0.5 | 0.5 | 0.5 | 0.5 |
| 66 | 209 | 274 | 148 | 152 | 196 | 191 | 143 |
| 104 | 258 | 280 | 224 | 257 | 279 | 240 | 207 |
| 136 | 276 | 286 | 237 | — | 281 | 273 | 257 |

As can be seen from the table, at the 136° C. and 104° C. mold temperatures, only talc and PTFE (polytetrafluoroethylene) gave improvements in heat deflection temperatures relative to the particulate-free composition. At 66° C., only talc gave an improvement. Heat deflection temperate at a mold temperature of 66° C. with 0.25 wt. % talc was 274° C., which is only 2° C. lower than the 276° C. HDT achieved at a 70° C. higher mold temperature with the particulate-free composition.

I claim:

1. A composition comprising (i) a polyphthalamide component comprising at least two recurring units selected from the group consisting of terephthalamide units, isophthalamide units and adipamide units and which, when filled with 33 weight percent glass fibers, has a heat deflection temperature at 264 psi, according to ASTM D-648, of at least about 240° C.; (ii) about 10 to about 200 parts by weight reinforcing fibers per hundred parts by weight of the polyphthalamide component; and (iii) about 0.01 to 5 parts by weight particulate talc per hundred parts by weight of the polyphthalamide component, said particulate talc having an average particle size of at least about one micron.

2. The composition of claim 1 containing about 0.01 to about 2 parts by weight of the talc per hundred parts by weight of the polyphthalamide component.

3. The composition of claim 1 wherein the polyphthalamide component comprises at least two recurring units selected from the group consisting of:

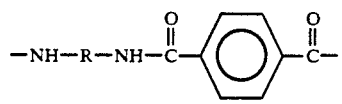
A

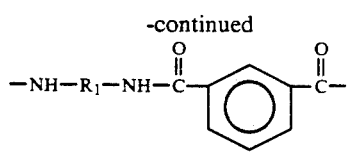 B and

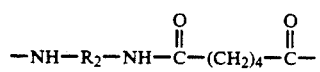 C wherein R, $R_1$ and $R_2$ independently comprise a straight chain or cyclic aliphatic divalent radical which is unsubstituted or has up to one methyl substituent per carbon atom.

4. The composition of claim 3 wherein R, $R_1$ and $R_2$ comprise hexamethylene.

5. The composition of claim 4 wherein the reinforcing fibers comprise glass fibers.

6. The composition of claim 5 containing about 15 to about 100 parts by weight glass fibers per hundred parts by weight of the polyphthalamide component and about 0.1 to about 2 parts by weight of the talc per hundred parts by weight of the polyphthalamide component.

7. The composition of claim 6 wherein the mole ratio of dicarboxylic acid moieties in the units A, B and C is about 65-95:25-0:35-5.

8. The composition of claim 6 wherein the mole ratio of dicarboxylic acid moieties in the units A, B and C is about 40-65:0-15:20-60.

9. The composition of claim 6 wherein the mole ratio of dicarboxylic acid moieties in the units A, B and C is about 70-99:30-1:0.

10. A molded article comprising the composition of claim 1.

11. A composition comprising (i) a polyphthalamide component which when filled with 33 weight percent glass fibers has a heat deflection temperature at 264 psi, according to ASTM D-648, of at least about 240° C. and comprising recurring units:

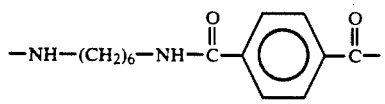 A

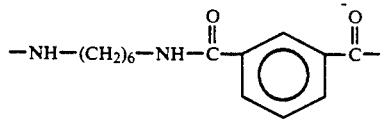 B and

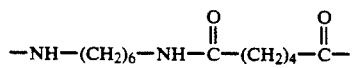 C such that the mole ratio of the dicarboxylic acid moieties in such units A:B:C is about 65-95:25-0:35-5; (ii) about 15 to about 100 parts by weight glass fibers per hundred parts by weight of the polyphthalamide component; and (iii) about 0.1 to about 2 parts by weight particulate talc per hundred parts by weight of the polyphthalamide component, said particulate talc having an average particle size of at least about one micron.

12. The composition of claim 11 additionally comprising about 0.01 to about 2 parts by weight per hundred parts by weight of the polyphthalamide component of a heat stabilizer selected from the group consisting of potassium iodide, sodium iodide and combinations thereof with cupric acetate.

13. The composition of claim 11 additionally comprising about 0.01 to about 5 parts by weight per hundred parts by weight of the composition of a mold release agent selected from the group consisting of aluminum distearate, hexamethylene bis-stearamide wax and combinations thereof.

14. The composition of claim 11 wherein the mole ratio of the dicarboxylic acid moieties in the units A, B and C is about 65:25:10.

15. The composition of claim 14 additionally comprising about 0.01 to about 2 parts by weight per hundred parts by weight of the polyphthalamide component of a heat stabilizer selected from the group consisting of potassium iodide, sodium iodide and combinations thereof with cupric acetate and about 0.01 to about 5 parts by weight per hundred parts by weight of the composition of a mold release agent selected from the group consisting of aluminum distearate, hexamethylene bis-stearamide wax and combinations thereof.

16. A molded article comprising the composition of claim 11.

* * * * *